United States Patent
Wooster

Patent Number: 5,154,006
Date of Patent: Oct. 13, 1992

[54] TAPE MEASURE CLIP FOR HOLDING MARKER

[76] Inventor: Allan Wooster, 4516 Pacific Ave., Tacoma, Wash. 98408

[21] Appl. No.: 804,041

[22] Filed: Dec. 9, 1991

[51] Int. Cl.⁵ .................................................. G01B 3/10
[52] U.S. Cl. ........................................ 331/768; 33/668
[58] Field of Search ............... 33/768, 770, 761, 760, 33/759, 668, 27.03

[56] References Cited

U.S. PATENT DOCUMENTS

| | | | |
|---|---|---|---|
| 4,296,554 | 10/1981 | Hammerstrom | 33/668 X |
| 4,760,648 | 8/1988 | Doak et al. | 33/760 X |
| 4,964,225 | 10/1990 | Waldherr | 33/668 X |

Primary Examiner—Harry N. Haroian

[57] ABSTRACT

A clip for clasping a marking device such as a carpenter's pencil mounts against the side of a conventional tape measure case, secured to the case by a screw that is located in the center of the side of the case (or integrated into a tape case). The marker is engaged by the clip in a recess and oriented such that the marking device is angularly directed to a contact point with its end a given distance from the case and next to the tape measure when it is extended from the case. In an alternative embodiment, the described clip is mounted to an end of an extension rod with the other end of the rod rotatably mounted to the tape measure case such that the clip with engaged marking device is free to rotate at the direction of the user.

12 Claims, 2 Drawing Sheets

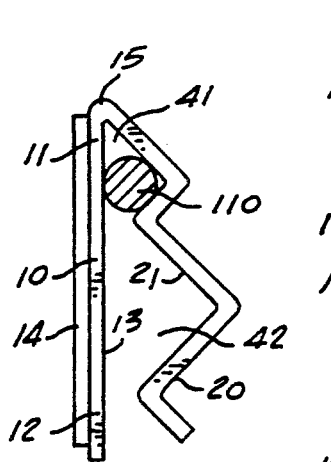 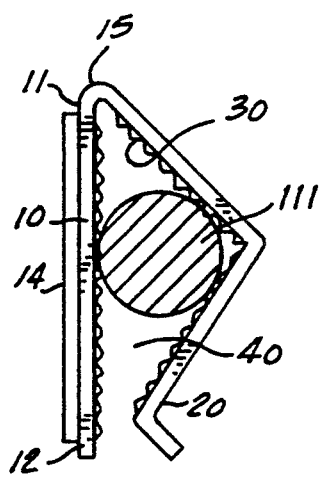 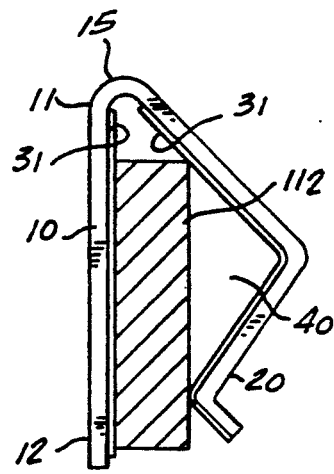
FIG. 3a.  FIG. 2a.  FIG. 2b.
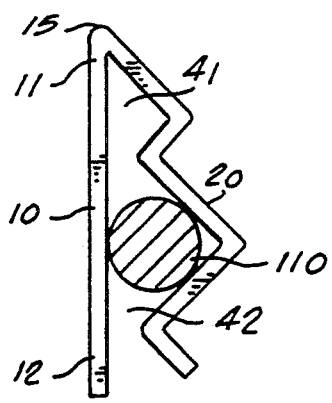 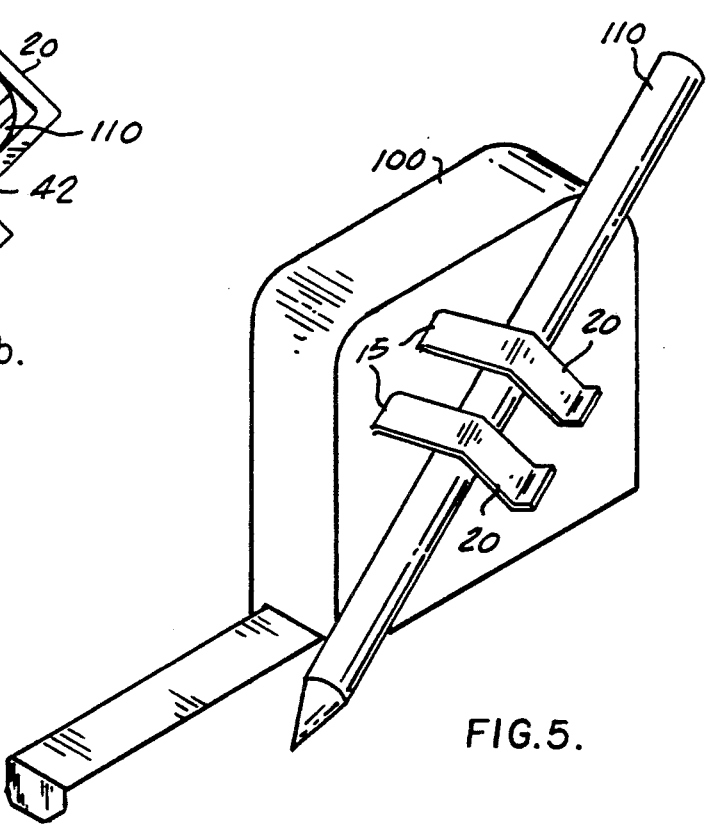
FIG. 3b.  FIG. 5.

TAPE MEASURE CLIP FOR HOLDING MARKER

BACKGROUND OF THE INVENTION

The present invention relates generally to tape measures commonly used in construction and, more specifically, to a clip for mounting on the side of or integrated into a typical tape measure case for holding a marking device such as a scratcher or a carpenters pencil.

Use of tape measures that wind into a hand-held case have been used in general construction by carpenters, plumbers and others for some time. For example, a carpenter draws his tape with one hand along a piece of wood to a required length and with his other hand marks his measurement with a pencil or some other marker.

It is often inconvenient to use both hands in the measuring process; one hand may be needed otherwise, such as for holding the piece of wood. Prior to this invention, another person was often needed to assist the workman in such cases. If the measuring tape could provide a means to make the required measurement mark, the other hand could be free for other related tasks, or the helper would not be required.

It is therefore the object of this invention to provide a tape measure case or an attachment to a tape measure case that provides a marker clip for holding a marker to the case, oriented on the case with the marking end near the tape where it is extended from the case.

It is another object that the clip have a means for preventing the marker from sliding under slight pressure of marking.

A further object is that that clip provides for facile rotation of the marker by action of the hand holding the tape measure.

SUMMARY OF THE INVENTION

In the preferred embodiment of the present invention, the foregoing objects are accomplished by providing a clip that mounts against the side of a conventional tape measure case, secured to the case by a screw that is typically located in the center of the side of the case. The clip comprises a back plate generally matching the clip case side surface and two transversely spaced legs extending from the back and then resiliently biased toward the back plate defining a recess between the legs and the back plate, shaped to receive marking devices of varied sizes and shapes such as a carpenter's pencil, a scratcher, or a drafting pencil. The marker is then engaged against the front and back portions along three circumferentially-spaced lines of contact for the snug frictional fit, oriented such that the marking device is angularly directed to a contact point with its end a given distance from the case and next to the tape measure when it is extended from the case. Alternatively, a single leg extending transversely along the clip back can substitute for the two spaced-apart legs.

The snug frictional engagement of a marking device in such recess deters sliding movement of the marker longitudinally in the clip. Because marking devices often have a smooth outer surface sometimes difficult to firmly grasp, the recess may also be provided with grip-promoting transverse ridges or a high-friction, grip-promoting inner layer to deter sliding movement of the marker within the clip recess.

Because the single screw mounting the clip to the measuring case may loosen or allow the clip to rotate under the screw over extended use of the clip for marking, the outer surface of the clip back may also be provided with grip-promoting ridges or a high-friction, grip-promoting inner layer to deter rotational movement of the clip against the measuring case.

In a further alternative embodiment, the described clip is rotatably mounted to an end of an extension rod with the other end of the rod mounted to the tape measure case such that the clip with engaged marking device is free to rotate at the direction of the user. The second end of the extension rod can be mounted in any of several methods. One such means comprises a mounting plate with a hole through which the screw passes for mounting the mounting plate to the tape measure, a cylinder or partial cylinder attached to the mounting plate, and the extension arm rotably within the cyclinder with circumferential enlargements on the extension rod at each end of the cyclinder to prevent longitudinal slipping of the rod within the cyclinder. To facilitate rotation of the extension bar with clip attached, a tab extends from the arm between the cylinder and the clip which, when pressed by a user, causes the arm to rotate in the cyclinder. Preferably, rod rotational movement is mildly opposed by a biasing spring that returns the rod to a rest position. One spring end is attached to the cylinder and its other end is attached to the extension rod. Alternatively, a spring may be secured between the tab and the tape case or mounting plate.

Alternatively, the clip can be integrated into a tape measure case instead of securing a separate clip to a standard tape measure case, as described.

BRIEF DESCRIPTION OF THE DRAWINGS

FIG. 2 is a side view of the clip showing a round marking device in FIG. 2a and a rectangular marking device such as a carpenter's pencil in FIG. 2b held by the clip under bias of the clip legs.

FIG. 3 is side view an alternative embodiment of the clip showing legs shaped to form a smaller recess bridging to a larger recess to accommodate varying marking device sizes. A small diameter marker is shown in FIG. 3a and a larger diameter marker is shown in FIG. 3b.

FIG. 5 is a perspective view of a further embodiment of the invention showing the marker clip integrated into a measuring tape case.

DESCRIPTION OF THE PREFERRED EMBODIMENTS

Figure 1:
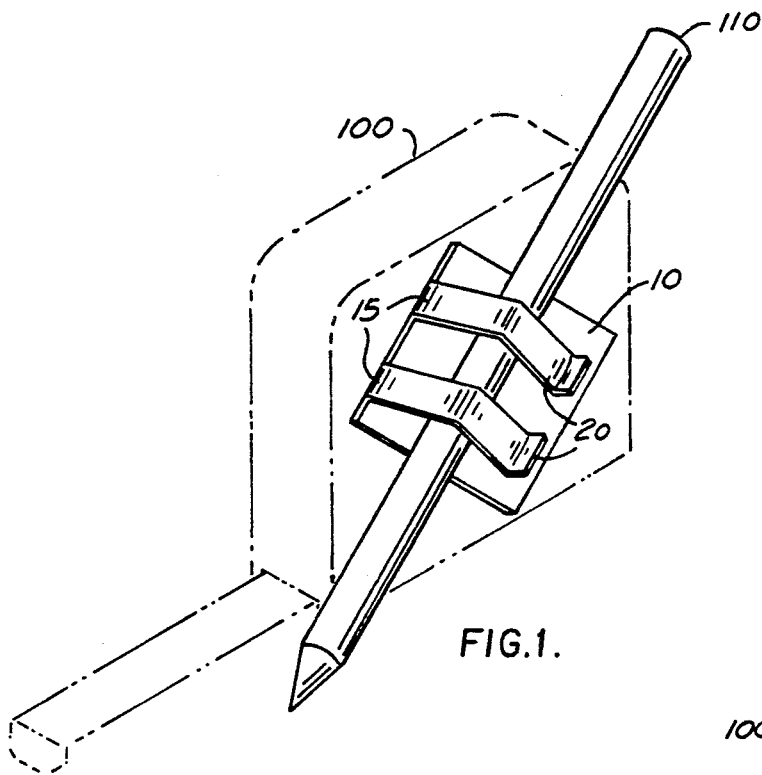
FIG. 1 is a perspective view of the first embodiment the tape measure case clip showing a mounting plate and resilient clip legs biased back toward the clip mounting plate.

Referring to the Figures, the measuring tape case clip can have several and various features. Generically, the clip comprises a plate 10 secured to a measuring tape case 100 and having one or more legs 20 resiliently biased back toward the case 100 and back plate 10, as shown in FIG. 1, forming a clip to hold a marking device 110 such as a scratcher or a pencil.

In the preferred embodiment, the present invention comprises a back mounting plate 10 and two tranversely spaced-apart legs 20 extending from the plate 10 at its top 11 and biased back toward the plate 10 at its bottom 12, forming a recess 40 between the plate 10 and the legs 20. This return bend at the joinder of the legs 20 to the back plate 10 forms a line of flexure for relative movement of the back plate 10 and the front legs 20. The recess 40 thus formed parallel to the line of flexure typically describes the general shape of a triangle so that markers of various sizes and shapes can be firmly held by the clip parallel to the line of flexure without sliding. For example, the triangular shape allows for grasping of marking pens 111 of circular cross-section as shown in FIG. 2a and also of rectangular marking devices 112, such as a carpenter's pencil, as shown in FIG. 2b.

Because marking devices can vary considerably in cross-section, for example, a scratcher can be much smaller than a marking pen, a second embodiment of the invention is provided with two recesses. As shown in FIG. 3, the legs 20 first extending from the back plate 10 and first returning back toward the back plate form a small triangular first recess 41. As the legs 20 extend again away from the back plate 10 and then bend back toward the back plate 10 a second time, a larger triangular second recess 42 is formed with the first recess 41 flaring into the second recess 42. The leg free ends finally flare away from the back plate 10 so a marking device 110 can be easily inserted into the clip.

When a marking device 110 such as a marking pen 111 is inserted in the clip, the legs 20 grasp the device snugly to prevent longitudinal sliding in the clip by frictional resistance. Because many marking devices have a smooth surface susceptible to slipping, the plate inner surface 13 and the leg inner surface 21 can further comprise grip-promoting ridges 30 or high-frictional layers 31. Also, because pressure of the marking process, however slight, acts as a torgue on mounting screw 130, a highly frictional layer 14 is also provided on mounting back plate 10 to add a mild adherence of the plate 10 to the case 100 to resist rotation of the clip.

Figure 4:
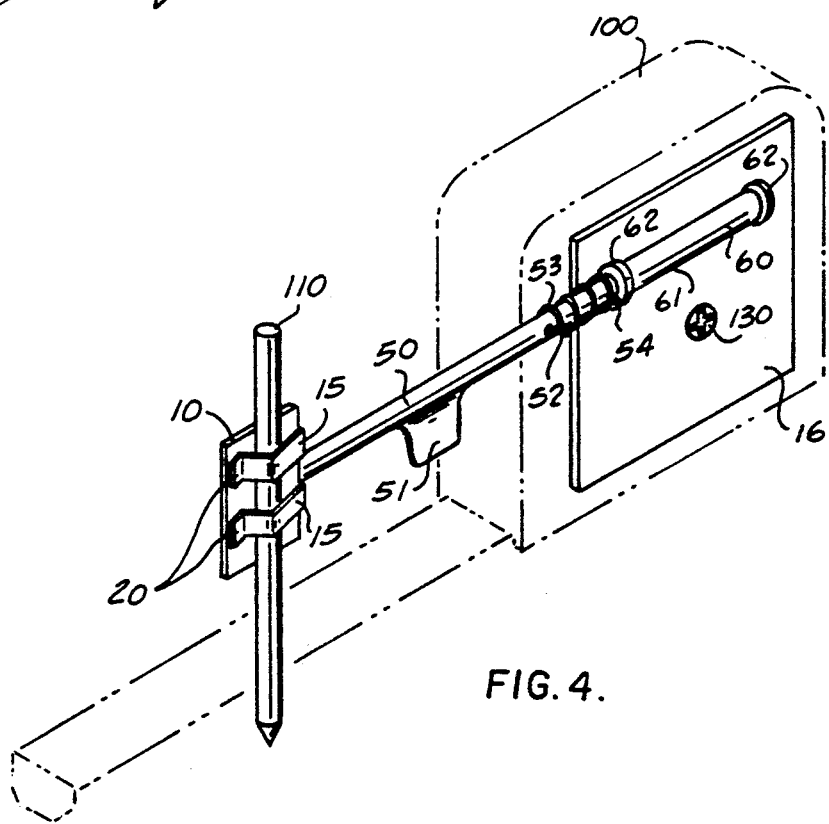
FIG. 4 is a perspective view of an alternative mount of the clip, shown rotatably mounted on an extension bar.

An alternative mounting arrangement of the clip 1 is shown in FIG. 4. To incorporate a capability to rotate the marking device, thus striking a mark on the measured item, the clip is mounted to an extension bar 50. The extension bar 50 is rotatably mounted to the measuring tape case 100, for example, by mounting the extension bar in a simplified hinge 60 attached to the case. The simplified hinge 60 as shown comprises a right cylinder 61 attached on its length to a mounting plate 16, secured to the tape case by mounting screw 130. The extension bar 50 is rotatably secured in the cylinder 61. Longitudinal sliding of the bar 50 in the cylinder 61 is prevented by a circumferential ring 62 on the bar 50 at each end of the cylinder 61. A tab 51 extending from the bar 50 between the cylinder 61 and the clip allows the user to rotate the marker by depressing the tab 51, thus causing the marker 110 to swing an arc and strike a mark. Preferably, a spring 52 biased to return the extension bar 50, clip and marker 110 to a raised rest position is provided with a first spring end 53 attached to the cylinder 61 and a second spring end 54 attached to the extension bar.

Having described the invention, what is claimed is:

1. A clip mounted to a tape measure case for firmly holding a marking device and oriented to strike marks on item measured, comprising
    a back plate having a top and a bottom,
    a front portion extending from the back plate at its top and biased back toward the bottom plate at its bottom forming a line of flexure and a recess in the general shape of a triangle between the back plate and the front portion so that markers of various sizes can be firmly held by the clip in the triangular recess parallel to the line of flexure,
    means for mounting the clip to the tape measure case.

2. The clip of claim 1 wherein the front portion comprises two or more transversely spaced-apart legs.

3. A clip mounted to a tape measure case for firmly holding a marking device and oriented to strike marks on items measured, comprising
    a back plate having a top and a bottom,
    a front portion comprising leg means first extending from the back plate and first returning back toward the back plate forming a line of flexure and a small first recess then extending again away from the back plate and then bending back toward the back plate a second time forming a larger triangular second recess with the first smaller recess flaring into the larger second recess so that markers of various sizes can be firmly held by the clip in the recess parallel to the line of flexure,
    means for mounting the clip to the tape measure case.

4. The clip of claim 3 wherein the first recess flaring into the second recess is sized such that a traditional carpenter's pencil placed firmly into the clip is held by the clip with contact points at the back plate, the front portion extending away from the back plate, and the front portion biased back toward the plate.

5. The clip of claim 1 or claim 3 wherein a marker is held within the clip with at least 3 circumferential points of contact between the clip and the marker providing a snug friction fit to deter sliding movement of the marker within the clip.

6. The clip of claim 1 further comprising grip-promoting transverse ridges on inner surfaces of the clip for grasping the marking device.

7. The clip of claim 1 further comprising grip-promoting frictional layers on inner surfaces of the clip for grasping the marking device.

8. The clip of claim 1 further comprising a frictional layer between the case and the clip to resist rotation of the clip on the case.

9. The clip of claim 1 further comprising means for rotatably mounting the clip to the tape measure case providing a capability to make a mark with the marking device held by the clip by striking an arc on rotation of the clip.

10. The clip of claim 9 wherein the means for rotatably mounting the clip to the tape measure case comprises
    a mounting plate,
    means for attaching the mounting plate to the tape measure case,
    a cylinder attached on its length to the mounting plate,
    an extension rod with a first end rotatably in the cylinder and a second end afixed to the clip,
    a circumferential ring on the rod at each end of the cylinder to prevent longitudinal sliding of the rod in the cylinder.

11. The clip of claim 10 further comprising a tab extending from the rod between the cylinder and the clip such that a user can rotate the marker in the clip by depressing the tab, thus causing the marker to swing an arc and strike a mark.

12. The clip of claim 10 further comprising a spring biased to return the extension bar, clip and marker to a raised rest position, having a first spring end attached to the cylinder and a second spring end attached to the extension bar.

* * * * *